United States Patent [19]

Tappe et al.

[11] 4,322,213
[45] Mar. 30, 1982

[54] PROCESS FOR THE PRODUCTION OF RESERVE EFFECTS ON POLYESTERCELLULOSE MIXED FIBER TEXTILES

[75] Inventors: Horst Tappe, Dietzenbach; Horst Kindler, Frankfurt am Main; Kurt Roth; Sien L. Ong, both of Hofheim, all of Fed. Rep. of Germany

[73] Assignee: Cassella Aktiengesellschaft, Frankfurt, Fed. Rep. of Germany

[21] Appl. No.: 264,719

[22] Filed: May 18, 1981

[30] Foreign Application Priority Data

May 23, 1980 [DE] Fed. Rep. of Germany ....... 3019726

[51] Int. Cl.$^3$ .............................................. D06P 5/12
[52] U.S. Cl. ........................................ 8/449; 8/464; 8/466; 8/532; 8/549; 8/592; 260/158; 260/164
[58] Field of Search ..................... 8/449, 464, 466, 532

[56] References Cited

U.S. PATENT DOCUMENTS 3,787,178 1/1974 Renfrew ................................ 8/524
4,265,629 5/1981 Ribka et al. ............................ 8/449

OTHER PUBLICATIONS

Chemical Abstracts, 1965, 63, 565b.

*Primary Examiner*—A. Lionel Clingman
*Attorney, Agent, or Firm*—Connolly and Hutz

[57] ABSTRACT

Printed textiles and a process for production of resist effects on textile materials of mixed fibers of polyester and cellulose comprising impregnating the materials with a dye liquor containing dischargeable disperse dyestuffs and dischargeable reactive dyestuffs which react with the resisting agents, drying or partially drying the materials and subsequently printing a resist paste on the materials, and heat-treating the materials at temperatures of 100° to 190° C., the improvement comprises said dischargeable disperse dyestuffs are of the formula

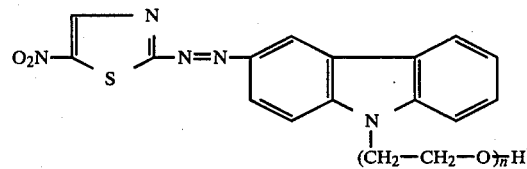

wherein n is a number of 1 to 9;
said dischargeable reactive dyestuffs being those containing reactive moieties of the formula

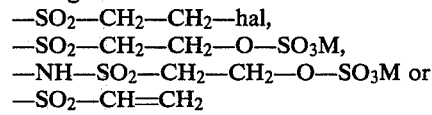

wherein M is hydrogen or a metal cation and hal is halogen; and the resist paste contains an alkali metal sulphite or an alkali metal bisulphite in combination with an alkali metal carbonate of alkali metal bicarbonate.

9 Claims, No Drawings

PROCESS FOR THE PRODUCTION OF RESERVE EFFECTS ON POLYESTERCELLULOSE MIXED FIBER TEXTILES

In the field of textile printing, the production of white or coloured designs with sharp edges on a dark-coloured background has always been a problem. In particular, if it is desired to produce a filigree-like design on a dark substrate, direct printing of the textile material will not work at all. In order to produce such designs, it has been known for a long time to print a discharge paste in the desired pattern onto a deep background dyeing produced by means of a dyestuff dischargeable to white and then to destroy the dyestuff on the areas printed with the discharge paste by a dry or wet heat treatment. After the prints thus obtained have been washed out, the desired design is obtained as white on a dark ground. It is also already known to add to the discharge printing pastes dyestuffs which are resistant to the discharging agent. In this case, at the same time as the ground dyeing is destroyed, the textile material is dyed on the printed areas by means of the indestructible dyestuff. Coloured prints on a dark ground are obtained in this case. Coloured prints on a dark ground can also be obtained if the dark ground is produced using a mixture of a dischargeable dyestuff and a non-dischargeable dyestuff of another colour, by introducing both types of dyestuff into the padding liquor.

The main patent application Ser. No. 105,204 now U.S. Pat. No. 4,265,629 relates to a process for the production of reserve effects on textile materials based on mixed fibres composed of polyester and cellulose, particularly polyester-cotton fibres, by impregnating the materials with dye liquors containing, in addition to customary dyeing and padding auxiliaries, disperse dyestuffs and reactive dyestuffs which react with the reserving agents and which optionally contain further disperse dyestuffs and reactive dyestuffs which are resistant to the reserving agents, drying or incipiently drying the padded materials and then printing on a reserve paste which if desired, contains, in addition to the reserving agent, disperse dyestuffs and reactive dyestuffs which are resistant to the reserving agent, subjecting the materials to a heat treatment at temperatures from 100° to 190° C. and then fixing the reactive dyestuff by means of alkali in a manner which is in itself known, characterised in that the dischargeable disperse dyestuffs employed are dyestuffs of the formula I

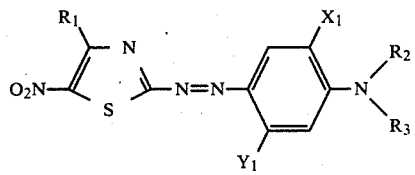

wherein $R_1$ denotes hydrogen, cyano or optionally substituted alkyl or phenyl; $X_1$ denotes hydrogen, halogen or optionally substituted alkyl or alkoxy; $Y_1$ denotes hydrogen, halogen, optionally substituted alkyl or alkoxy, or —NH—CO—$Y_2$ or —NH—SO$_2$—$Y_2$ wherein $Y_2$ represents alkyl, phenyl or amino; $R_2$ denotes hydrogen or an optionally substituted alkyl or alkenyl; and $R_3$ denotes an optionally substituted alkyl, alkenyl or phenyl, or dyestuffs of the formula II

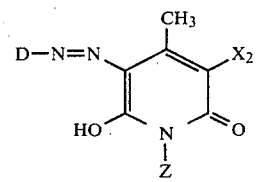

wherein D represents phenyl which, if appropriate, contains at least one substituent; $X_2$ represents hydrogen, lower alkyl, carbamoyl, cyano, chlorine, bromine, nitroso, nitro, lower alkylcarbonyl, sulphamoyl, lower alkylsulphonyl, lower alkylcarbonylamino or lower alkoxycarbonyl and Z represents hydrogen or lower alkyl; or disperse dyestuffs which are free from groups imparting solubility in water and which contain at least two carboxylic acid ester groups, and the dischargeable reactive dyestuffs employed are dyestuffs which contain reactive radicials of the formulae III to VI $$-SO_2-CH_2-CH_2-hal \qquad (III)$$

$$-SO_2-CH_2-CH_2-O-SO_3M \qquad (IV)$$

$$-NH-SO_2-CH_2-CH_2-O-SO_3M \qquad (V)$$

$$-SO_2-CH=CH_2 \qquad (VI)$$

wherein M denotes hydrogen or a metal cation and hal denotes halogen, and a reserve paste containing, as the reserving agent, (a) an alkali metal sulphite or an alkali metal bisulphite in combination with an alkali metal carbonate or an alkali metal bicarbonate and optionally an aldehyde and (b), if appropriate, a nonionic detergent, is employed.

In a further development of the process of the main application, it has been found that very good reserve effects are also obtained on the said textile materials if dyestuffs of the formula VII

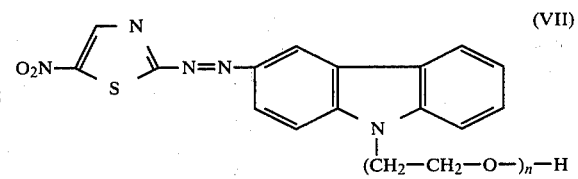

wherein n denotes a number from 1 to 9, preferably 1 to 5, are employed as the dischargeable disperse dyestuffs and if the procedure followed is in other respects according to the specifications of the main patent application. It is advantageous, particularly in view of the depth of colour which can be achieved, to employ mixtures of several, as a rule 2 to 4, dyestuffs of the formula VII, the proportions of the individual dyestuffs being appropriately between 5 and 95%, particularly between 10 and 40%.

The use of mixtures of dyestuffs of the formula VII wherein n is a number between 1 and 5, is particularly preferred.

The process according to the invention is carried out in a manner which is in itself known by padding the textile material composed of polyester and cellulose fibres with dye liquors containing one or more of the abovementioned disperse dyestuffs which can be discharged by means of alkali and one or more reactive dyestuffs which possess one of the abovementioned reactive radicals of the formulae III to VI, preferably the β-sulphatoethylsulphonyl or β-sulphatoethylsulphonamide groups, together with the known customary dyeing auxiliaries, such as, for example, dispersing agents, wetting agents, anti-foaming agents and padding auxiliaries and, additionally, if coloured discharge prints are to be produced, disperse dyestuffs and reactive dyestuffs which are resistant to the discharging agent, and squeezing out the padded fabric webs to a liquor pick-up of 50-120%. The fabric webs are then dried by means of warm air, if necessary preceded by infra-red radiation, the temperature being approx. 80° C. up to a maximum of about 150° C., the time being shortened correspondingly. The fabric webs thus prepared are then printed with the discharge reserve printing paste, which contains the reserving agents described above and also the additives which are knwon in printing pastes for textile printing, particularly thickeners. The padded and printed textile sheet-like structures are then subjected to a heat treatment at between 100° and 190° C. The supply of heat is preferably effected by means of superheated steam. The effect of the heat treatment is (a), on the areas which have been printed with the reserve paste, to inhibit the reservable disperse dyestuffs and reactive dyestuffs and to fix any nonreservable disperse dyestuffs and reactive dyestuffs which may be present, and (b), on the areas which have not been printed with reserve paste, to fix the disperse dyestuffs and also, if the padding liquor contained an alkali metal formate, to fix the reactive dyestuffs at the same time. In this context, inhibition of the dyestuff is to be understood as meaning the change in the dyestuff molecule which is brought about by the reserving agents and which results in the dyestuff concerned no longer dyeing the substrate. In the two-phase process, that is to say in the event that the padding liquor did not contain an alkali metal formate. Fixing of the reactive dyestuffs in the ground dyeing, that is to say on the areas not printed with reserve paste, then takes place.

Finally, the dyeings or prints are given a hot and cold rinse and are dried. A particular embodiment of the process according to the invention consists in the padding liquor additionally containing, as well as reservable disperse dyestuffs and reactive dyestuffs, disperse dyestuffs and reactive dyestuffs which are resistant to the reserving agent and are thus not destroyed by the discharge reserve printing pastes to be employed in accordance with the invention. If the procedure followed is in other respects as indicated above, multi-coloured designs are obtained. A further embodiment of the process according to the invention consists in not applying the reservable dyestuffs to the whole fabric by padding with a padding liquor, but printing them similarly on the fabric in the form of printing pastes and then after-printing the fabric with the discharge reserve printing paste. The textile prints are then subsequently fixed and finished as already described above. In this process too, it is possible to add dyestuffs which are resistant to the reserving agent to the colour printing pastes which have been printed on initially. In this case too, multi-coloured designs are obtained. A further possible means of carrying out the process according to the invention consists in printing discharge reserve printing pastes which, in turn, contain dyestuffs resistant to the reserving agent, on the ground which has been padded or printed with reservable dyestuffs. Here too, multi-coloured designs are obtained when the textile materials are subsequently fixed and finished as described above.

The disperse dyestuffs of the formula I are present in the padding liquors or in the printing pastes in a finely divided form, such as is customary and known for disperse dyestuffs, while the reactive dyestuffs are dissolved. The preparation of the padding liquors or printing pastes which are to be employed in accordance with the invention is also effected in a manner which is in itself known by mixing the constituents of the liquors or printing pastes, respectively, with the required quantity of water and liquid, finely disperse or solid, redispersible formulations of the disperse dyestuffs and solutions or formulations of the reactive dyestuffs.

As in the process of the main patent application, it is also advantageous in the further developed process of the present application to replace, by esters of relatively high-molecular polyglycols with carboxylic acids, the additives, particularly thickeners, such as, for example, alginates, starch products, synthetic polymeric thickeners, mineral oils, hydrotropic substances, such as, for example, urea, and additives which promote wetting, penetration and uptake of dyestuff, nonionic detergents, such as, for example, glycerol, and/or polyglycols, such as polyethylene glycol having an average molecular weight of 300 to 400, which are customary in the reserve pastes in addition to the said reserving agents. The use of polyglycol esters has a particularly advantageous effect if coloured discharges are to be produced, that is to say if disperse dyestuffs and reactive dyestuffs which are resistant to the reserving agents are concomitantly used in the ground dyeing on the area printed with the reserve paste, or are contained in the reserve paste.

Examples of polyglycol carboxylic acid esters which can be employed with particular advantage in the reserve pastes to be used in accordance with the invention are described in German Auslegeschrift No. 1,138,735.

It is particularly advantageous, in accordance with Patent Application No. P 2,952,312.4 of addition to the main patent application No. P 2,856,283.6, to dispense with the customary addition of mineral oils in the preparation of the printing paste and instead of this to employ printing pastes containing, per kg, 30 to 250 g, preferably 50 to 150 g, of an auxiliary of the general formula VIII

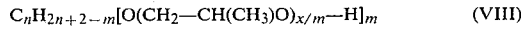

wherein n is an integer from 2 to 6, m is an integer from 1 to 6 and x is a number from 20 to 60, with the proviso that m is smaller than or equal to n.

Auxiliaries of the formula VIII in which m is 1 are preferred for use in the process according to the invention.

With regard to the quality of the appearance of the goods, it is also very advantageous in the case of the present process if the printing pastes employed contain, additionally to the auxiliaries of the formula VIII, 0.2 to 2 g of esterification products of relatively high-molecular polyglycols with higher alkanecarboxylic and alkenecarboxylic acids, per kg. Products of this type are already known and available commercially as dispersing agents and emulsifiers. They can be represented by the general formula IX

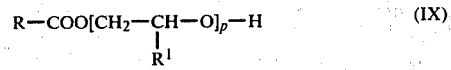 (IX)

In this formula, R denotes alkyl or alkenyl having 10 to 22, preferably 16 to 18, C atoms, $R^1$ denotes hydrogen or —$CH_3$, preferably hydrogen, and p denotes a number from 20 to 80, preferably 35–55.

The illustrative embodiments which follow illustrate the present invention; all percentages relate to weight.

EXAMPLE 1

A 65:35 polyester-cotton mercerised mixed fabric is padded with a mixture consisting of 100 parts by weight of a 20% strength liquid formulation of the dyestuff of the formula X

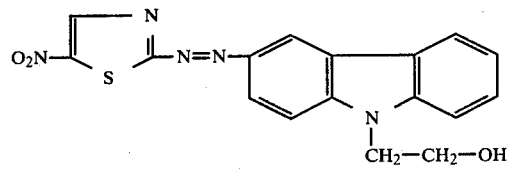 (X)

40 parts by weight of the liquid commercial form of C.I. Reactive Yellow 17, C.I. No. 18,852, 808 parts by weight of cold water, 10 parts by weight of sodium m-nitrobenzenesulphonate, 20 parts by weight of an anti-migration agent based on polyacrylic acid, 2 parts by weight of monosodium phosphate and 20 parts by weight of sodium formate.

The fabric is dried carefully in a hot flue at 80–100° C. and is after-printed by the film printing process using a printing paste consisting of 25 parts by weight of the commercial form of [5-(3,6-dichloropyridazin-4-ylcarbonylamino)-2-methyl-3-sulphophenyl]-3-carboxy-4-(2-sulphophenylazo)-5-pyrazol-5-one, 40 parts by weight of the liquid commercial form of C.I. Reactive Yellow 2, C.I. No. 18,972, 150 parts by weight of urea, 199 parts by weight of cold water, 10 parts by weight of sodium m-nitrobenzenesulphonate, 500 parts by weight of a stock thickener composed of 230 parts by weight of a 4% strength aqueous alginate thickener, 80 parts by weight of a 10% strength aqueous starch ether thickener, 85 parts by weight of water, 25 parts by weight of a 10% strength aqueous solution of the condensation product of polyglycol 2,000 with stearic acid and 80 parts by weight of solvent naphtha, 40 parts by weight of sodium bicarbonate, 30 parts by weight of 38° Bé sodium bisulphite solution and 6 parts by weight of 40% strength glyoxal solution.

After drying, fixing is carried out for 7 minutes at 175° C., using superheated steam, and after-treatment is carried out as indicated in Example 1.

Yellow coloured effects on a ruby-red ground are obtained.

If 20 parts of the mixture of dyestuffs of the formula XI

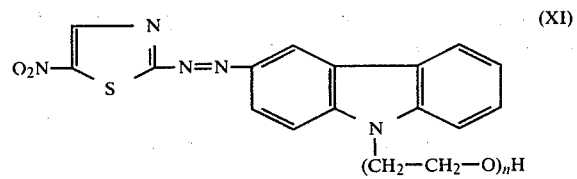 (XI)

wherein n has the following composition:
50% = 1
35% = 2
10% = 3
5% = 4, are used instead of 30 parts of the dyestuff of the formula X, a ruby-coloured print of virtually the same depth of colour which has very good coloristic properties, particularly yellow coloured effects and good fastness to light, fixing by dry heat, rubbing and washing and which has sharp outlines, is obtained.

What is claimed is:

1. In the process for production of resist effects on textile materials of mixed fibers of polyester and cellulose comprising impregnating the materials with a dye liquor containing dischargeable disperse dyestuffs and dischargeable reactive dyestuffs which react with the resisting agents, drying or partially drying the materials and subsequently printing a resist paste on the materials, and heat-treating the materials at temperatures of 100° to 190° C., the improvement comprises said dischargeable disperse dyestuffs are of the formula

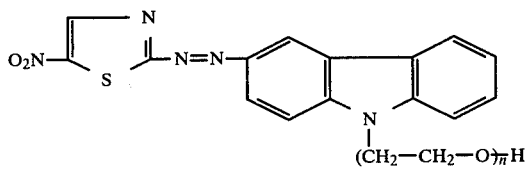

wherein n is a number from 1 to 9;
said dischargeable reactive dyestuffs being those containing reactive moieties of the formula
—$SO_2$—$CH_2$—$CH_2$—hal,
—$SO_2$—$CH_2$—$CH_2$—O—$SO_3M$,
—NH—$SO_2$—$CH_2$—$CH_2$—O—$SO_3M$ or
—$SO_2$—CH=$CH_2$ wherein M is hydrogen or a metal cation and hal is halogen; and
the resist paste contains an alkali metal sulphite or an alkali metal bisulphite in combination with an alkali metal carbonate or alkali metal bicarbonate.

2. The process according to claim 1 wherein n is a number from 1 to 5 in the formula of the dischargeable disperse dyestuffs.

3. The process according to claim 1 or claim 2 wherein the dischargeable disperse dyestuffs contain a mixture of at least two species of said disperse dyestuffs.

4. The process according to claim 1 wherein said dischargeable reactive dyestuff contains reactive moieties of the formula —$SO_2CH_2CH_2$—O—$SO_3M$ or —NH—$SO_2$—$CH_2CH_2$—O—$SO_3M$.

5. The process according to claim 1 wherein said resist paste contains an aldehyde/alkali metal bisulphite addition reaction product.

6. The process according to claim 5 wherein the resist printing paste also contains 30 to 250 grams per kilogram of paste of an auxiliary of the formula $$C_nH_{2n+2-m}[O(CH_2-\underset{\underset{CH_3}{|}}{CH}-O)_{x/m}H]_m$$

wherein n is an integer from 2 to 6, m is an integer from 1 to 6 and x is a number from 20 to 60, with the proviso that m is less than or equal to n.

7. The process according to claim 6 wherein the resist printing paste also contains 0.2 to 2 grams per kilogram of paste of the esterification products of high-molecular polyglycols with higher alkanecarboxylic and alkenecarboxylic acids.

8. The process according to claim 7 wherein the resist paste contains a polyglycol carboxylic acid ester nonionic detergent.

9. Textile materials having resist effects produced by the process of claim 1.

* * * * *